United States Patent Office 2,694,618
Patented Nov. 16, 1954

2,694,618

PROCESS FOR SEPARATING CERTAIN HEAVY METALS FROM ORES

Joseph L. Gillson, Wilmington, Del., and William K. Wilkinson, Waynesboro, Va., assignors to E. I. du Pont de Nemours & Company, Wilmington, Del., a corporation of Delaware No Drawing. Application December 6, 1950,
Serial No. 199,552

18 Claims. (Cl. 23—135)

This invention relates to a new process for separating certain heavy metals from ores containing them in a combined form.

The principal processes for the extraction of metals from ores include reduction of metallic oxides with hydrogen or carbon, or treatment of the ore with acidic solutions followed by various separation treatments, e. g., electrolysis. In general, the known metal extraction processes involve high temperature treatments and/or the use of corrosive and non-recoverable extraction liquids. Furthermore, carbonates, sulfates, oxides, etc. of the heavy metals are not recovered readily by methods that are applicable to sulfides, the compounds in which most of the non-ferrous metals occur. Moreover, many known methods are not of high efficiency in the treatment of low grade ores.

This invention has as an object a process for the recovery of metals from ores containing them in the form of carbonates or oxides. Another object is a process for the treatment of low grade ores for the recovery of their mineral content. A further object is a process not requiring elevated temperatures or the use of corrosive solutions. Other objects will appear hereinafter.

These objects are accomplished by the present invention of a process for separating metals of groups I–B, II–B, IV–B and VIII of the periodic table and of atomic number above 26 from ores containing them in the form of oxides or carbonates, which comprises treating the ore with an aqueous solution of a polyhydroxyalkanemonothiol of five to six carbon atoms, preferably a monothio sugar alcohol, whereby the metal compound is solubilized, separating the aqueous solution from the undissolved ore, and regenerating the metal as its water-insoluble sulfide by treating said aqueous solution with hydrogen sulfide or an alkali metal or ammonium sulfide, whereby the polyhydroxyalkanemonothiol is regenerated at the same time.

Polyhydroxyalkanemonothiols suitable for use in the process of this invention may be prepared, according to the method described in U. S. Patent 2,402,640, by the catalytic hydrogenation of sugars in the presence of hydrogen sulfide. They contain five or six carbon atoms and they have the configuration of an aldose or ketose monosaccharide except that the carbonyl group has been replaced by the group

Examples of suitable polyhydroxythiols are the pentahydroxyhexanethiols, such as 1-thiosorbitol, 2-thiosorbitol, thiomannitol, thiodulcitol; the tetrahydroxyhexanethiols, such as thiorhamnitol; the tetrahydroxypentanethiols, such as thioxylitol, etc. The most accessible and most useful of these compounds for the process of this invention is 1-thiosorbitol. These thio sugar alcohols are readily soluble in water. They need not be used in a state of purity. On the contrary, for the purpose of this invention it is much more economical and nearly as effective to use the crude products directly as they are obtained by the above-mentioned hydrogenation process in the presence of hydrogen sulfide. For example, a satisfactory reagent in the process of this invention is a crude reaction product containing 75–90% of 1-thiosorbitol. The concentration of the polyhydroxythiol in the aqueous solution used to extract the ore is not critical; it may vary, for example, from 1% to 50% of polyhydroxythiol based on the weight of the water, a generally useful range being 5–25%. It is only necessary to use as much polyhydroxythiol as is needed to combine with the extractable metals, although in practice it is desirable to use an excess.

In the preferred practice of this invention, the ore to be extracted is first finely divided, for example down to a particle size such that the particles pass a 16-mesh sieve. It is not necessary to separate the gangue and other extraneous material first, although this can be done if desired. The crushed ore is then extracted with a 5–25% aqueous solution of 1-thiosorbitol between 0° C. and the boiling point of the solution, a preferred temperature range being 20–100° C., for a time sufficient to allow the metallic oxides and/or carbonates to dissolve, and the aqueous solution is separated by filtration from the undissolved material. This treatment solubilizes the oxides and carbonates and in some cases the halides (if any are present) of metals of atomic number above 26 in groups I–B, II–B, IV–B and VIII. It leaves as insoluble residue such compounds as the silicates, sulfides, etc., of those metals, and also water-insoluble compounds of metals of atomic number below 26, such as calcium carbonate, aluminum silicate, etc. The extraction process may be repeated one or more times if necessary. The aqueous solution, which contains the extractable metals as "salts" of 1-thiosorbitol, is then treated with hydrogen sulfide, or with ammonium sulfide or an alkali metal sulfide such as potassium or sodium sulfide. This treatment precipitates the metal as the water-insoluble sulfide which is isolated and treated in appropriate manner to regenerate the free metal, or metallic salts if desired. At the same time, the 1-thiosorbitol which was bound with the metal as a "salt" is regenerated and the aqueous solution can be reused after the excess hydrogen sulfide has been removed, for example by partial evaporation. If an alkali metal sulfide is used instead of hydrogen sulfide, the aqueous solution may be neutralized by controlled addition of acid to liberate the 1-thiosorbitol and hydrogen sulfide.

The periodic table referred to herein is the usual one as given in many textbooks, e. g., in Ephraim, "Inorganic Chemistry," fifth edition, Interscience Publishers, Inc., New York, 1948.

The following examples in which parts are by weight are ilustrative of the invention.

Example I

A simulated zinc ore was prepared by mixing 3 parts of calcium carbonate, 1.5 parts of zinc oxide, 1.5 parts of zinc carbonate and 3 parts of zinc silicate. Two parts of this ore mixture was stirred with a solution of 3 parts of 1-thiosorbitol in 30 parts of water at 50° C. for ten minutes. The mixture was then cooled and filtered and the insoluble residue was washed with water and dried. This insoluble residue, which consisted of calcium carbonate and zinc silicate, amounted to 1.39 parts, indicating that 0.61 part had been solubilized out of the 2 parts of ore mixture. This is equivalent to 92% of the extractable material (zinc oxide and zinc carbonate). Upon treatment of the filtrate with sodium sulfide, a white precipitate of zinc sulfide formed. To determine the amount of zinc extracted from the ore, the precipitate was filtered off, ignited, moistened with sulfuric acid, reignited and weighed as zinc sulfate. The amount of zinc sulfate so obtained (0.88 part) corresponded to 0.36 part of zinc, which is 84% of the total zinc (0.43 part) present as oxide and carbonate in the amount of ore treated.

Example II

Two portions of one part each of the same simulated ore mixture as in Example I were each stirred at 20° C. with a solution of 1.35 parts of 1-thiosorbitol in 75 parts of water, the pH of these systems being 6.5–6.8. In one case, the extraction lasted 20 minutes, in the other case one hour, and the subsequent isolation of zinc sulfide and conversion to zinc sulfate was carried out as in Example I. There was no significant difference in the amount of zinc extracted in the two experiments. In each case, it was about 65% of the zinc present in the samples as oxide and carbonate. From 90 to 96% of the 1-thiosorbitol used was recovered from the aqueous solutions.

*Example III*

Three naturally occurring zinc-bearing ores were subjected to an extraction treatment as described below. Ore A, "Nevada Stock Pile," was an oxidized ore in its natural state. Ore B, "Roasted Mexican Carbonate," was a processed ore which, however, had not been treated for the removal of zinc. Ore C, "Electrolytic Plant Residues," was the waste product of a zinc refining process; in other words, it had been treated for removal of zinc but still contained a large amount of zinc not removed by the process used. The zinc in this ore was present as zinc oxide, zinc sulfate and zinc ferrate. These ores had the following percentage compositions, as determined analytically:

|  | Ore A (Nevada Stock Pile) | Ore B (Roasted Mexican Carbonate) | Ore C (Electrolytic Plant Residue) |
|---|---|---|---|
| Zn | 1 37 | 1 42 | 1 32 |
| Pb | 4 | 5 | 3 |
| Fe | 2 | 2 | 20 |
| Cu | Trace | Trace | 1 |
| CaO | 9 | 2 | 1 |
| MgO | 6 | | |
| S | 0.3 | | |
| $CO_2$ | 20 | | |
| Insoluble | 13 | 25 | 10 |

The values given are average values for all elements or compounds listed.
1 Average.

Each of the above three ore samples was treated individually in the following manner. The ore was ground to pass a 16-mesh screen, then air-dried at 120° C. Ten (10) parts of the ore was added to a solution of 15 parts of crude 1-thiosorbitol (analyzing for 80% of pure 1-thiosorbitol) in 80 parts of water and the slurry was stirred at 20–25° C. for two hours and filtered. The solid residue was again extracted with a solution of 6 parts of crude 1-thiosorbitol in 25 parts of water at 80° C. for one-half hour to remove additional extractable salts. The filtrates of the first and second extractions were separately treated with hydrogen sulfide, whereupon a voluminous yellow-brown precipitate formed and was filtered off. The precipitates, which consisted of a mixture of sulfides of the extracted metals, were washed with water until free of hydrogen sulfide and thiosorbitol, dried at 150° C. for two to three hours and weighed. They were then analyzed polarographically for zinc and lead.

The table below shows the amount of ore extracted, the amount of zinc and lead present in each ore sample before extraction, the amount of zinc and lead removed from each ore sample by the first and second extractions, and the percentage of the total zinc and lead extracted.

| Ore sample, parts | Metal present in ore, parts | | Metal extracted, parts | | Total metal extracted, percent | |
|---|---|---|---|---|---|---|
| | Zn | Pb | Zn | Pb | Zn | Pb |
| Ore A, 10 | 3.6 | 0.35 | 1.03 | 0.21 | 34 | 69 |
| | | | 0.19 | 0.03 | | |
| | | | 1.22 | 0.24 | | |
| Ore B, 10 | 4.2 | .5 | 1.42 | 0.35 | 41 | 78 |
| | | | 0.31 | 0.04 | | |
| | | | 1.73 | 0.39 | | |
| Ore C, 10 | 3.4 | 0.2 | 1.10 | 0.08 | 34 | 45 |
| | | | 0.05 | 0.01 | | |
| | | | 1.15 | 0.09 | | |

As already noted, one of the ore samples, viz., ore C, had already been processed for the removal of zinc prior to the extraction treatment described, and it was considered as an industrial waste. Nevertheless, the extraction treatment removed 34% of the zinc and 45% of the lead still present in this residual ore. In addition, ore C contained 0.1 part of copper in the ten parts of ore treated. The first extraction removed 43.5% of this copper, as determined by gravimetric analysis of the sulfide mixture from the first extraction.

While this invention has been illustrated with specific reference to the extraction of zinc, lead and copper from ores, it is generally applicable to the treatment of ores containing metals of groups I–B, II–B, IV–B and VIII of the periodic table and of atomic number above 26, and preferably from 27 to 82, inclusive, in the form of oxides (including hydrated oxides) and of carbonates, such metals being exemplified by cobalt, nickel, copper, zinc, silver, cadmium, tin, mercury and lead. Thus, the process is applicable to such natural ores as, for example, zincite (ZnO), smithsonite ($ZnCO_3$), hydrozincite ($ZnCO_3.ZN[OH]_2$), aurichalcite $(2[Zn.Cu]CO_3.3[Zn.Cu][OH]_2)$ calamine ($2ZnO.SiO_2.H_2O$), cerussite ($PbCO_3$), leadhillite ($Pb[OH]_2.PbSO_4.PbCO_3$), matlockite $(PbO.PbCl_2)$ massicot (PbO), zaratite ($NiCO_3.2Ni[OH]_2.4H_2O$), genthite ($2NiO.2MgO.3SiO_2.6H_2O$), azurite $(2CuCO_3.Cu[OH]_2)$ cuprite ($Cu_2O$), atacamite ($CuCl_2.3Cu[OH]_2$), malachite ($CuCO_3.Cu[OH]_2$), brochantite $(CuSO_4.3Cu[OH]_2)$ cassiterite ($SnO_2$), montroydite (HgO), spherocobaltite ($CoCO_3$), argentojarosite ($Ag_2Fe_6[OH]_{12}[SO_4]_4$), cadmium oxide, and the like.

The invention is also applicable to processed ores, that is, ores that have been oxidized to oxides by known metallurgical methods. For example, lead sulfide (galena) can first be roasted to the oxide, then subjected to extraction with a polyhydroxythiol.

Certain water-insoluble metal halides, such as cuprous chloride, lead chloride, platinum iodide and silver chloride are also solubilized by treatment with an aqueous solution of a polyhydroxymonoalkanethiol, such as 1-thiosorbitol, and can be precipitated from their solutions as sulfides.

The effectiveness of the process of this invention depends on the selective solubilizing action of polyhydroxyalkanethiols on metal compounds, which permits the ready separation of the oxides or carbonates of metals of atomic number above 26 and preferably of atomic number 27 to 82, inclusive, in groups I–B, II–B, IV–B and VIII from a number of other constituents, e. g., alumina, iron oxide, aluminum silicate, limestone, barium carbonate, quartz, fluorspar, calcite, feldspar and other silicates, and other metals, metallic sulfides, arsenides, antimonides and sulfosalts with which they may be associated in ores. This method also separates these compounds from a variety of compounds occurring in nature in which the metal belongs to other groups than those listed. Viewed broadly, therefore, the invention is a process for separating the specified metals from their ores whereby the oxides (including the hydrated oxides) and carbonates of said metals are dissolved in an aqueous solution of a polyhydroxyalkanemonothiol of five to six carbon atoms and said aqueous solution is separated from the insoluble ore residue. In general, it is convenient to regenerate the metal from said solution as the sulfide, but it can be regenerated in the form of other salts if desired, such as the chloride or sulfate, by treatment with the appropriate acid or water-soluble salt thereof.

The term "oxide" used herein includes also the hydrated oxides.

The foregoing detail description has been given for clearness of understanding only and no unnecessary limitations are to be understood therefrom. The invention is not limited to the exact details shown and described for obvious modifications will occur to those skilled in the art.

What is claimed is:

1. A process for the extraction of zinc from an ore containing the same as a compound of the class consisting of oxide and carbonate, said ore also containing compounds of metals other than those which are of atomic number above 26 and are in groups I–B, II–B, IV–B, and VIII, which comprises extracting the finely divided ore with an aqueous solution of thiosorbitol and separating the extract containing said zinc from the residual ore containing compounds of said other metals.

2. A process for the extraction of lead from an ore containing the same as a compound of the class consisting of oxide and carbonate, said ore also containing compounds of metals other than those which are of atomic number above 26 and are in groups I-B, II-B, IV-B, and VIII which comprises extracting the finely divided ore with an aqueous solution of thiosorbitol and separating the extract containing said lead from the residual ore containing compounds of said other metals.

3. A process for the extraction of zinc from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a polyhydroxyalkanemonothiol of five to six carbons and separating the extract containing said zinc from the residual ore containing compounds of said other metals.

4. A process for the extraction of lead from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a polyhydroxyalkanemonothiol of five or six carbons and separating the extract containing said lead from the residual ore containing compounds of said other metals.

5. A process for the extraction of zinc from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a monothio sugar alcohol of five to six carbons and separating the extract containing said zinc from the residual ore containing compounds of said other metals.

6. A process for the extraction of lead from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a monothio sugar alcohol of five to six carbons and separating the extract containing said lead from the residual ore containing compounds of said other metals.

7. A process for the extraction of a metal of atomic number above 26 in groups I-B, II-B, IV-B, and VIII, from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a monothio sugar alcohol of five to six carbons and separating the extract containing said metal of atomic number above 26 from groups I-B, II-B, IV-B, and VIII from the residual ore containing said compounds of other metals.

8. A process for the extraction of a metal of atomic number above 26 in groups I-B, II-B, IV-B, and VIII, from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a polyhydroxyalkanemonothiol of five to six carbons and separating the extract containing said metal of atomic number above 26 from groups I-B, II-B, IV-B, and VIII from the residual ore containing said compounds of other metals.

9. A process for the extraction of a metal of atomic number above 26 in groups I-B, II-B, IV-B, and VIII, from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of thiosorbitol and separating the extract containing said metal of atomic number above 26 from groups I-B, II-B, IV-B, and VIII from the residual ore containing said compounds of other metals.

10. A process for the extraction of copper from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a polyhydroxyalkanemonothiol of five to six carbons and separating the extract containing said copper from the residual ore containing said other metals.

11. A process for the extraction of copper from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of thiosorbitol and separating the extract containing said copper from the residual ore containing said other metals.

12. A process for the extraction of zinc from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of thiosorbitol, separating the extract containing zinc from the residual ore containing compounds of said other metals, and isolating zinc as the sulfide by treatment of the extract containing zinc with a water soluble sulfide.

13. A process for the extraction of zinc from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a polyhydroxyalkanemonothiol of five to six carbons, separating the extract containing zinc from the residual ore containing compounds of said other metals, and isolating zinc as the sulfide by treatment of the extract containing zinc with a water soluble sulfide.

14. A process for the extraction of a metal of atomic number above 26 in groups I-B, II-B, IV-B, and VIII, from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a polyhydroxyalkanemonothiol of five to six carbons, separating the extract containing said metal of atomic number above 26 from groups I-B, II-B, IV-B, and VIII from the residual ore containing compounds of said other metals, and isolating the metal as the sulfide by treatment of the extract with a water soluble sulfide.

15. A process for the extraction of zinc from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a monothio sugar alcohol of five to six carbons, separating the extract containing zinc from the residual ore containing compounds of said other metals, and isolating zinc as the sulfide by treatment of the extract containing zinc with a water soluble sulfide.

16. A process for the extraction of a metal of atomic number above 26 in groups I-B, II-B, IV-B, and VIII, from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of a monothio sugar alcohol of five to six carbons, separating the extract containing said metal of atomic number above 26 from groups I-B, II-B, IV-B, and VIII from the residual ore containing compounds of said other metals, and isolating said metal as the sulfide by treatment of the extract with a water soluble sulfide.

17. A process for the extraction of a metal of atomic number above 26 in groups I-B, II-B, IV-B, and VIII, from an ore containing the same as a compound of the class consisting of oxide and carbonate, said ore also containing compounds of metals other than those which are of atomic number above 26 and are in groups I-B, II-B, IV-B, and VIII, which comprises extracting the finely divided ore with an aqueous solution of thiosorbitol, separating the extract containing said metal of atomic number above 26 from groups I-B, II-B, IV-B, and VIII from the residual ore containing compounds of said other metals, and isolating said metal as the sulfide by treatment of the extract with a water soluble sulfide.

18. A process for the extraction of a metal of atomic number above 26 in groups I-B, II-B, IV-B, and VIII, from an ore containing the same as a compound of the class consisting of oxide and carbonate, and in addition compounds of metals other than those which are of atomic number above 26 and are in groups I-B, II-B, IV-B, and VIII which comprises extracting the finely divided ore with an aqueous solution of thiosorbitol, separating the extract containing said metal of atomic number above 26 from groups I-B, II-B, IV-B, and VIII from the residual ore containing compounds of said other metals, and isolating said metal of atomic number above 26 in the recited groups as the sulfide by treatment of the extract with a water soluble sulfide.

References Cited in the file of this patent

UNITED STATES PATENTS

| Number | Name | Date |
|---|---|---|
| 932,643 | Schneider | Aug. 31, 1909 |
| 2,020,918 | Stutz et al. | Nov. 12, 1935 |
| 2,117,205 | Myhren | May 10, 1938 |
| 2,131,313 | Colton | Sept. 27, 1938 |
| 2,440,729 | Signaigo | May 4, 1948 |